July 20, 1948.　　　　F. P. FRANCIS　　　　2,445,479
AUTOMATIC METERING WATER INJECTOR FOR ENGINES
Filed Feb. 26, 1947　　　　　　　　　　　　　　2 Sheets-Sheet 1
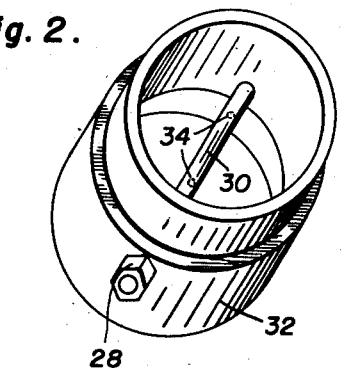
Fig. 2.
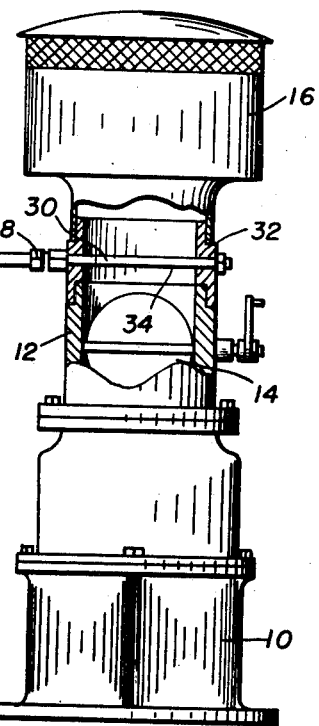
Fig. 1.
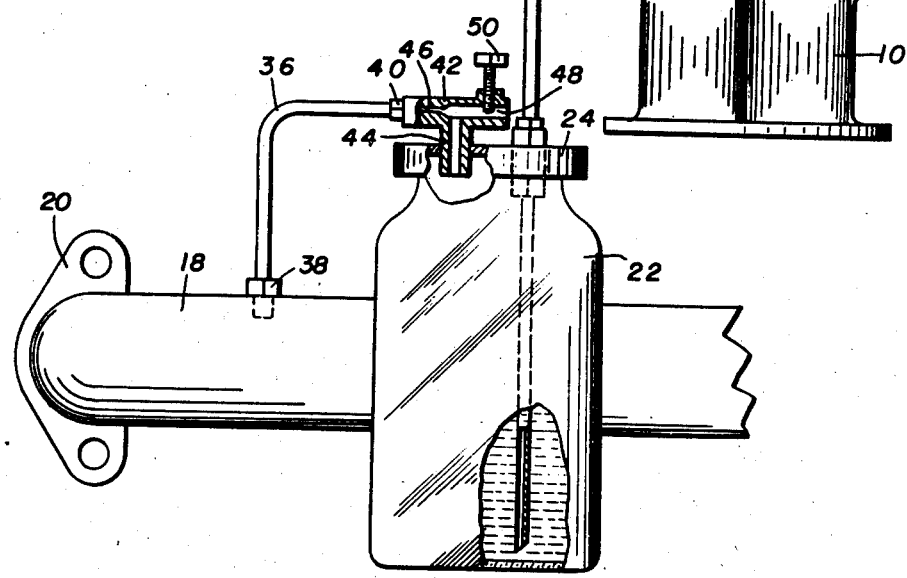
Inventor
Fred P. Francis
By Clarence A. O'Brien
and Harvey B. Jacobson
Attorneys

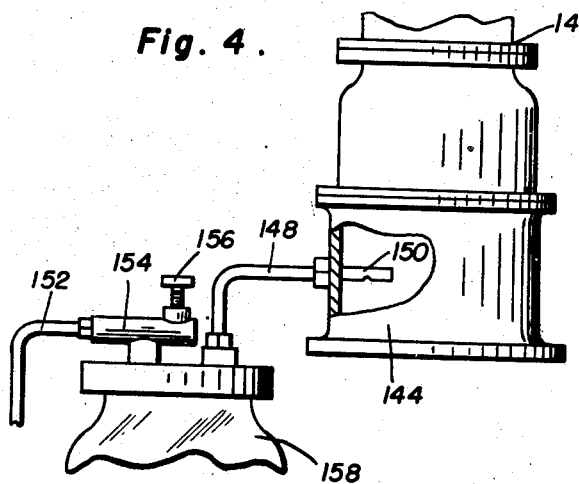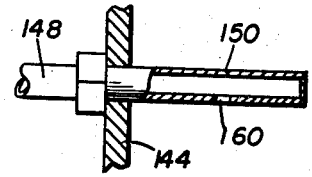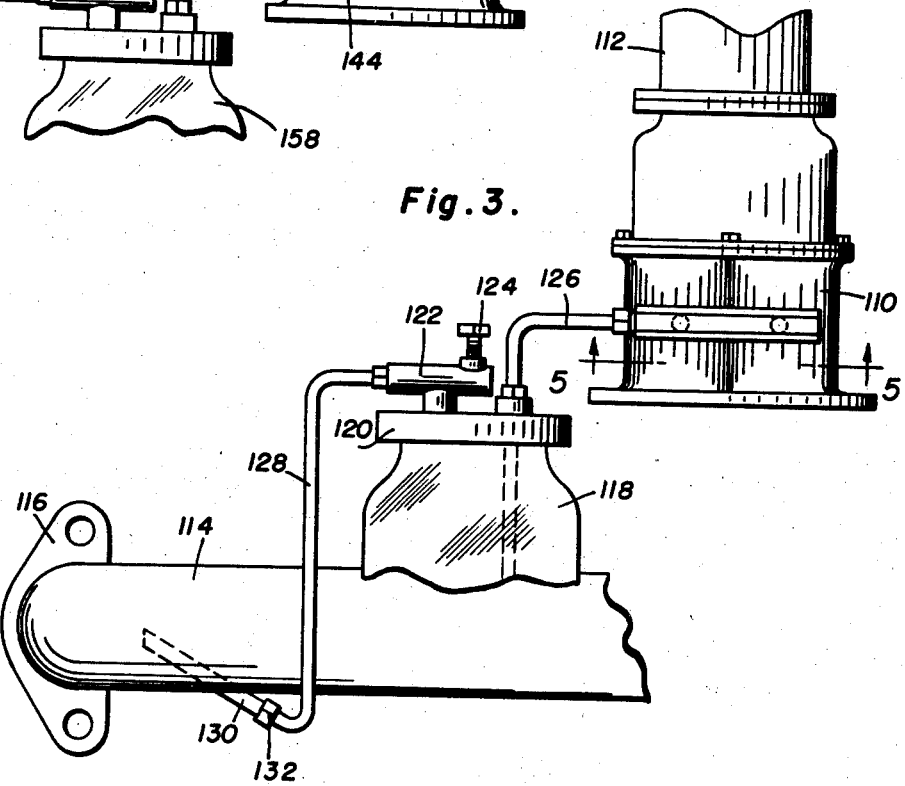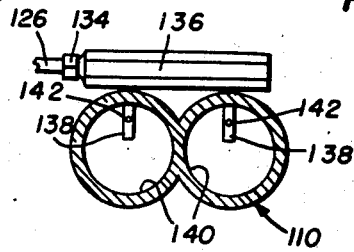

Patented July 20, 1948

2,445,479

UNITED STATES PATENT OFFICE 2,445,479

AUTOMATIC METERING WATER INJECTOR FOR ENGINES

Fred P. Francis, Hartford, Conn.

Application February 26, 1947, Serial No. 731,110

8 Claims. (Cl. 123—25)

This invention comprises novel and useful improvements in an automatic metering water injector for engines together with an improved method of injecting water into an internal combustion engine.

It is a well known phenomenon in the operation of internal combustion engines that their efficiency and operating characteristics may be materially improved by the admission of proper quantities of water, properly admixed with the combustible charge in the combustion chamber thereof. Heretofore, however, it has been substantially impossible to obtain the full advantage of this long known phenomenon owing to the necessity for accurately controlling the introduction of the water into the combustion chamber of an internal combustion engine in accordance with the requirements of the same which vary widely in response to different operating conditions of an engine as well as varying with different makes and individual engines.

It is therefore a primary purpose of this invention to overcome the above mentioned difficulties by providing an efficient and novel means and method for introducing water in accurately controlled quantities and in accordance with the varying loads upon an engine and the varying rates of fuel consumption thereof.

An important purpose of the invention resides in providing a method for accurately metering and feeding water into the incoming charge or charge constituent of an internal combustion engine by means of a pressure applied to the water, this pressure being automatically varied in accordance with and in proportion to the rate of fuel consumption of the engine.

A further important object of the invention is to provide a method for advantageously supplying water to the charge of an internal combustion engine in a manner wherein it will readily and completely mix with the charge; and in response to an effective pressure which shall be a resultant of the varying intake manifold pressure (known as suction) and the varying exhaust pipe pressure.

Yet another important object of the invention consists in providing a method for injecting water into an internal combustion engine in accurately and variably controlled quantities and in conformity with varying operating characteristics of an engine without the employment of any moving mechanical part.

An additional important object of the invention consists in providing an apparatus for automatically and accurately injecting quantities of water into the intake pipe of an internal combustion engine in response to variations in exhaust pipe pressure.

An additional and further important object of the invention consists in providing an apparatus in accordance with the preceding objects, wherein improved and highly efficient means are provided for applying selective proportionate exhaust pipe pressures to a water tank for automatically supplying water to the engine.

A still further object of the invention consists in providing an apparatus in accordance with the preceding objects wherein water may be supplied to the intake conduit of an internal combustion engine in response to a differential between the varying intake pressure and a pressure adjustably proportioned to the exhaust pipe pressure of the engine.

Additional auxiliary objects of the invention consist in providing a method and a device which are equally applicable to all types of internal combustion engines whether designed for automotive or aeronautical use, which may be easily installed thereon, and which may be readily adjusted or calibrated for maximum efficiency in conformity with the individual characteristics of an engine.

These, together with various ancillary objects of the invention which will later become apparent as the following description proceeds, are attained by the method and apparatus set forth in the following specification and disclosed in the accompanying drawings, wherein:

Figure 1 is a fragmentary diagrammatic view illustrating the application of the device and method to the intake and exhaust pipe of an internal combustion engine, this embodiment of the invention being particularly suitable for an automobile engine;

Figure 2 is a perspective view of an adapter element for applying the device to an engine;

Figure 3 is a view similar to Figure 1 but showing the device applied to an engine intended for aeronautical use;

Figure 4 is a fragmentary detail, parts being broken away to show the arrangement thereof, and showing the device applied to a modification of the intake pipe construction shown in Fig. 3;

Figure 5 is a horizontal sectional view taken substantially upon the section line 5—5 of Figure 3; and Figure 6 is an enlarged fragmentary detail view of a portion of Figure 4.

Referring now more specifically to the annexed drawings, wherein like numerals indicate similar parts throughout the various views, attention is directed first to the form of the invention shown in Figures 1 and 2, wherein 10 indicates a conventional type of twin barrel, down-draft type of carburetor which is adapted to be secured to the intake manifold of an internal combustion engine, not shown, but which may be of the well-known Ford V-8 type, while 12 indicates the customary air inlet supply pipe for the carburetor 10 having the conventional choke valve 14 and which is surmounted by the customary air cleaner 16.

A portion of the exhaust pipe 18 provided with an attaching flange 20 for securing the same upon the exhaust ports of the internal combustion engine, not shown, is, at its other extremity, provided with the customary muffler commonly associated with automotive vehicles, and which may be of any suitable construction, not shown. In accordance with the principles of this invention, a water tank or container 22 of any suitable construction is mounted in any desired manner and is preferably provided with a detachable or refillable cover 24 which provides a closure means for sealing the water tank from the atmosphere, except as set forth hereinafter. A water delivery conduit is supported by or secured to the cover 24 and extends therethrough in air-tight sealed engagement therewith, and its lower extremity terminates adjacent the bottom of the container 22, while the upper extremity of the conduit is detachably connected, as by a coupling nut 28, with a metering discharge nozzle 30 which is preferably disposed diametrically across the air intake pipe 12 between the air filter 16 and the carburetor choke valve 14. It should be here noted that within the dictates of this invention, the discharge nozzle 30 may be applied directly to the pipe 12, or as shown, may be disposed in an adapter sleeve 32 interposed between the air filter 16 and the pipe 12. This latter construction has the advantage that the attachment may be applied to an existing engine, such as an automobile engine, without the necessity for drilling a bore through the intake pipe.

The metering nozzle 30 is provided with a plurality of discharge orifices 34 which are arranged on the downstream side of the nozzle with respect to the air flow past the same. It should be here noted that the areas of the discharge nozzle orifices are so proportioned that the variations of suction existing within the intake pipe 12 at this point are insufficient in themselves to elevate water from the tank 22 through the delivery conduit 16 and induct the same into the intake manifold. It should also be noted that the tank 22 is disposed at a suitable distance below the level of the nozzle 30, whereby a syphoning action is prevented during periods of low suction or when the engine is stopped, to thereby obviate flooding of the intake pipe by a syphoning action.

In order to automatically feed the water into the intake pipe in variable quantities in accordance with varying operating characteristics of the engine, the following construction is provided. An exhaust gas discharge conduit 36 is provided having one end suitably capped into the exhaust pipe 18, as at 38, while the other end thereof is connected, as at 40, with a T-shaped fitting 42 whose hollow tubular stem 44 extends through the tank closure 24 in an air-tight manner. The horizontal arm of the T-fitting 42 is provided with a pair of aligned bores 46 and 48 which constitute adit and exit means, respectively, the latter discharging to the atmosphere as shown. It should be particularly noted that the adit 46 is of materially less diameter than that of the discharge opening 48, whereby the latter is capable of discharging the entire flow of the conduit 36 with no back pressure thereon, if desired. The outlet orifice 48 is provided with a throttling means which may consist of a screw, indicated at 50, for restricting the effective area of the discharge orifice and thereby build up and maintain the back pressure within the T-shaped fitting which may bear any predetermined ratio to the exhaust pressure existing in the exhaust pipe 18. It may be here noted that in an automotive vehicle the presence of the muffler, not shown, will necessarily maintain an appreciable back pressure within the exhaust pipe 18, which back pressure will necessarily be of a fluctuating nature and will vary in accordance with the rate of fuel consumption of the engine. Accordingly, a portion of the exhaust gases passing through the conduit 36 are retained and diverted through the tubular stem 44 of the T-shaped fitting into the container 22 above the surface of the water thereof, for applying and maintaining a pressure thereon which will be in proportion to the pressure existing in the exhaust pipe 18.

From the foregoing explanation, it is believed that the manner of operating the device and its construction will be now readily understood. Once the device has been installed upon an automotive engine, it is merely necessary to regulate the throttling effect of the adjusting screw 50, whereupon a pressure will be maintained in the tank 22 which will bear any desired proportionate relation to the exhaust pressure in the exhaust pipe 18, for feeding water to the delivery conduit 26 into the intake pipe 12. Obviously, the screw 50 may be so adjusted that the pressure built up will vary from zero to a maximum within the tank 22, whereby the rate of feed of water from the tank into the intake pipe can be likewise varied from zero to a maximum. Preferably, the adjustment is so calibrated that the additional force exerted by the suction of the intake pipe through the nozzle 34 is necessary to feed water into the intake pipe. However, it may be so adjusted that the exhaust pressure itself is sufficient, without the aid of suction, to inject water. It should be particularly noted that as fuel is consumed in the engine at a faster rate, the exhaust pressure in the pipe 18 will rise, and the effective pressure exerted upon the water in tank 22 will likewise be proportionately raised, thereby proportionately injecting more water into the engine for improving the combustion characteristics of the charge. It is well known that the exhaust pressure varies in direct proportion to the rate of fuel consumption, while the suction in the intake manifold is a function of the throttle opening or load upon the engine. Thus, by means of this device, water may be supplied in controlled quantities in proportion to both the rate of fuel consumption as obtained from the exhaust pressure and the load upon the engine as obtained from the suction in the intake pipe.

The function of this water is well known to those skilled in this particular art, and serves generally to internally cool the engine, lessen the rate of flame propagation in the combustion chamber, permit greater volumetric charging of the cylinder by reason of the cold charge, preventing knocking, etc., and generally augmenting the efficiency and smoothness of performance of an engine.

It should be especially noted that by this construction and in accordance with this method, there are no moving parts to require constant adjustment or servicing, and when once adjusted to an individual engine, which should be done by actual test under operating conditions, the device is entirely automatic in its metering and feeding of water into the combustion engine.

Attention is next directed to the form of the invention shown in Figure 3. In this embodiment, the method and apparatus are illustrated as applied to an internal combustion engine of the aeronautical type, wherein a down-draft type of carburetor, indicated at 110 which may be of the double-barrelled type, is provided with an air inlet pipe 112, the rest of the engine being of conventional design. In aeronautical use, the exhaust pipe consists of a stack 114 detachably connected, as by a flange 116, with the exhaust ports of the engine, not shown, there being customarily no muffler provided for this type of engine. A water container or tank 118 having a cover 120 forming a closure therefor and sealing the interior of the container from the atmosphere is provided with a T-shaped fitting 122 having an adjusting screw 124 for regulating the escape of exhaust gas therefrom, and is provided with a water delivery conduit 126 which is connected with the carburetor 110, this construction being identical with that set forth in the preceding embodiment. However, since in this type of internal combustion engine no muffler is provided for the exhaust pipe 114, there is no back pressure existing in the exhaust stack, and accordingly the exhaust gas removal conduit or passage 128 is provided with an inlet nozzle 130 coupled, as at 132, to the conduit, which nozzle extends within a suitable topped aperture in the exhaust stack 114. As shown clearly in Figure 3, the inlet nozzle 130 is preferably positioned at an angle which is acute to the line of flow of the exhaust gases and which opens against the line of flow, whereby the moving exhaust gases may have a ram effect and enter the conduit 128 for producing a pressure therein.

As shown best in Figure 5, the water delivery conduit 126 is detachably connected, as at 134, with a header 136 having laterally disposed discharge nozzles 138 extending through suitable drilled bores or apertures through the walls of the twin barrels 140 of the carburetor 110. Discharge orifices 142 in the nozzles 138 are provided, in any desired quantity, but their cross-sectional area is preferably proportioned in accordance with the principle set forth in the preceding embodiment. The operation of this device in the embodiment of Figure 3 is identical with that set forth in the embodiment of Figure 1, except that since no pressure is maintained in the exhaust pipe 114, it is necessary to employ a ram effect upon the nozzle 130 to build up a pressure within the fitting 122 and tank 118. This pressure, however, as before, is directly proportional to the rate of fuel consumption, and hence is utilized in the same manner to supply water to the engine.

Attention is next directed to the form of construction shown in Figures 4 and 6, which is a slight modification of the arrangement of Figure 3. Here, however, the device is shown applied to a single narrow carburetor 144, which is likewise provided with an air intake pipe 146 and which is supplied with water by means of a discharge conduit 148 and nozzle 150. As in the foregoing embodiment, the exhaust pressure is applied by means of pipe or passage 152 to the T-shaped fitting 154 and regulating screw 156 to the interior of the water tank 158. As shown in Figure 6, the nozzle 150 is disposed within the barrel of the carburetor 144, and has one or more discharge metering orifices 160 opening upon the downstream side of the air flow through the carburetor. The operation of the device is identical with that set forth in regard to Figure 3.

In all forms of the invention, the discharge orifices of the nozzles are disposed upon the downstream side of air flow, or combustible mixture flow, whereby the velocity of flow will assist rather than impede the emission of water from said orifices.

Since numerous modifications of the principles of this invention will readily occur to those skilled in the art after consideration of the annexed drawings and accompanying specification, it is not desired to limit the invention to the exact construction and method shown and described, but only as required by the appended claims.

What is claimed as new is as follows:

1. A method of supplying variable, controlled quantities of water to an internal combustion engine having intake and exhaust pipes and a carburetor comprising, providing an enclosed body of water, removing a portion of the exhaust products from the exhaust pipe, discharging a predetermined part of the removed portion of exhaust products directly to the atmosphere, conducting the predetermined remainder of the removed exhaust products to the enclosed body of water for applying and maintaining a varying pressure thereto proportioned to the varying pressure existing in the exhaust pipe and conducting water from said enclosed body to the intake pipe in response to said maintained pressure.

2. The method of claim 1 including the step of simultaneously applying a varying suction to said enclosed body of water in proportion to the suction variations in said intake pipe and supplying water to said intake pipe in response to the variable effective pressure resulting from the applied pressure and applied suction.

3. A device for injecting water into an internal combustion engine including a closed water tank, a water delivery conduit connecting said tank with an engine intake pipe and means for supplying controllable exhaust pressure to said tank including an exhaust passage communicating with said exhaust pipe and having an outlet discharging directly and freely to the atmosphere, means for throttling the escape of exhaust from said outlet and maintaining a pressure in said passage, and a conduit connecting said passage with said tank.

4. A device for injecting water into an internal combustion engine including a closed water tank, a water delivery conduit connecting said tank with an engine intake pipe and means for supplying controllable exhaust pressure to said tank including an exhaust passage communicating with said exhaust pipe and having an outlet discharging directly and freely to the atmosphere, means for throttling the escape of exhaust from said outlet and maintaining a pressure in said passage, and a conduit connecting said passage with said tank, said tank being disposed below the level of the communication of said water delivery conduit with the intake pipe.

5. A device for injecting water into an internal combustion engine including a closed water tank, a water delivery conduit connecting said tank with an engine intake pipe means for maintaining a column of water in said water-delivery conduit at a level proportional to the engine exhaust pipe pressure ready for induction into said intake pipe, means for varying the height of the column, said first means including an exhaust passage communicating with the engine exhaust pipe and having an outlet discharging directly and freely to the atmosphere, said second means including means for variably throttling the escape of exhaust from said outlet and maintaining a pressure in said passage, and a conduit connecting said passage with said tank, means for inducting water by intake pipe suction from the top of said column into said intake pipe, said last means including discharge nozzles connected with said conduit and positioned in the intake pipe.

6. A device for injecting water into an internal combustion engine including a closed water tank, a water delivery conduit connecting said tank with an engine intake pipe and means for supplying controllable exhaust pressure to said tank including an exhaust passage communicating with said exhaust pipe and having an outlet discharging directly and freely to the atmosphere, means for throttling the escape of exhaust from said outlet and maintaining a pressure in said passage, and a conduit connecting said passage with said tank, said exhaust passage adjacent its outlet being mounted on said tank and said means being mounted on said exhaust passage.

7. A device for injecting water into an internal combustion engine including a closed water tank, a water delivery conduit connecting said tank with an engine intake pipe and means for supplying controllable exhaust pressure to said tank including an exhaust passage communicating with said exhaust pipe and having an outlet discharging directly and freely to the atmosphere, means for throttling the escape of exhaust from said outlet and maintaining a pressure in said passage, and a conduit connecting said passage with said tank, said means being manually adjustable to regulate the rate of escape of exhaust gas from said outlet.

8. In an internal combustion engine, in combination, an intake pipe, a carburetor between said intake pipe and an engine intake manifold, an exhaust pipe, a water tank, means for releasing a predetermined portion of said withdrawn exhaust gases directly and freely to the atmosphere, means for supplying the remaining portion of said withdrawn exhaust gases to said tank to maintain a varying pressure therein proportional to the varying pressure in said exhaust pipe, means for conducting water from said tank to said intake pipe in response to the pressure maintained in said tank and in response to varying suction proportional to the suction variation in said intake pipe, and a water delivery conduit connecting said tank with said intake pipe, the intake suction being applied to the top of the conduit and the exhaust pressure to the bottom thereof.

FRED P. FRANCIS.

REFERENCES CITED

The following references are of record in the file of this patent:

UNITED STATES PATENTS

| Number | Name | Date |
|---|---|---|
| 1,280,643 | Benjamin | Oct. 8, 1918 |
| 1,626,798 | Fay | May 3, 1927 |